April 18, 1950 E. G. LOOMIS 2,504,337
MIXING MACHINE FOR PLASTIC MATERIALS
Filed Aug. 29, 1946 2 Sheets-Sheet 1
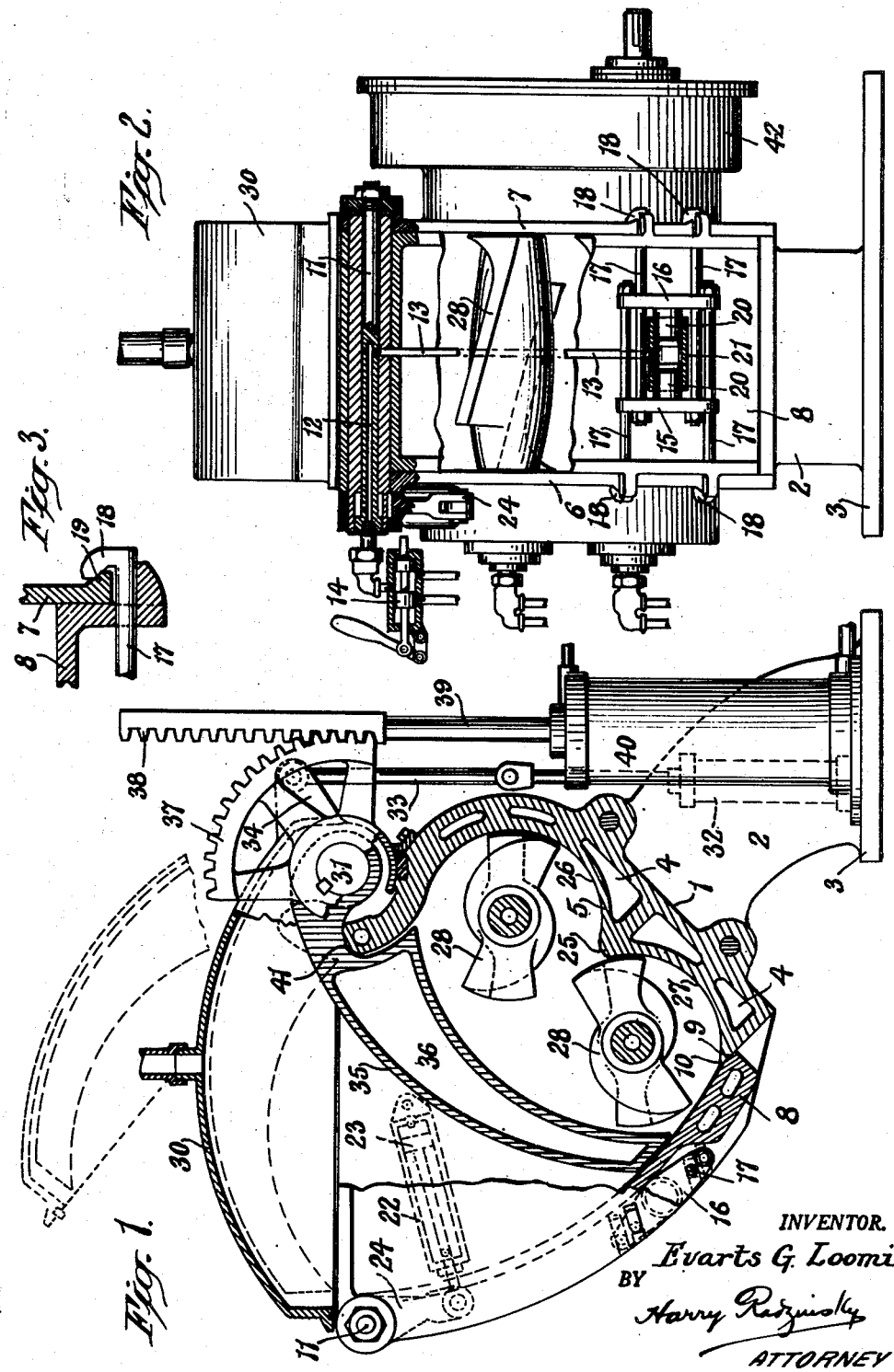
INVENTOR.
Evarts G. Loomis
BY
Harry Radzinsky
ATTORNEY

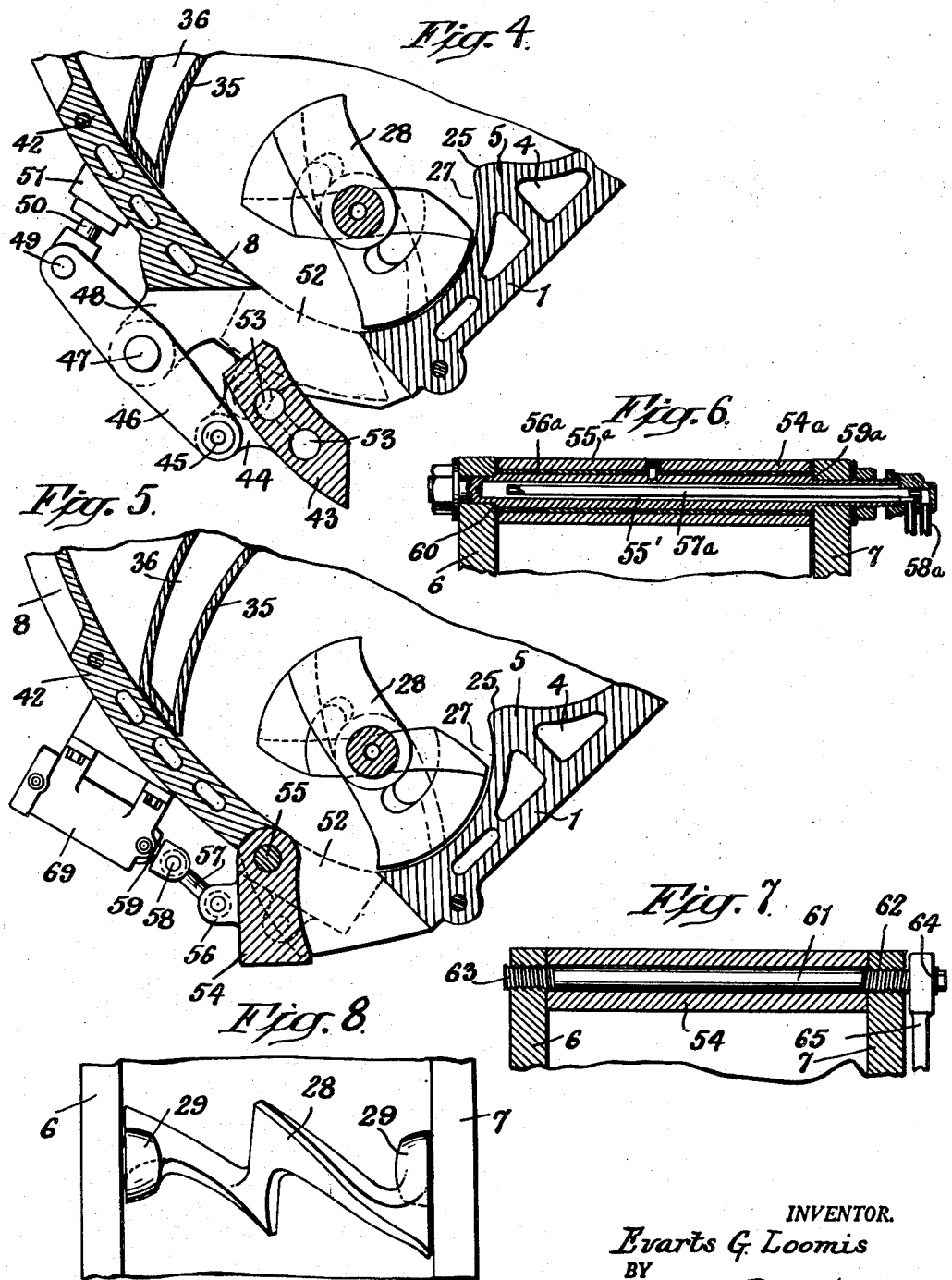

Patented Apr. 18, 1950

2,504,337

UNITED STATES PATENT OFFICE 2,504,337

MIXING MACHINE FOR PLASTIC MATERIALS

Evarts G. Loomis, Newark, N. J.

Application August 29, 1946, Serial No. 693,725

5 Claims. (Cl. 259—6)

This invention relates to a machine for mixing, agitating and treating materials, and particularly materials of a plastic or viscous nature. Machines of this general character are shown in my Patents No. 1,673,085, dated June 12, 1928, and No. 2,027,185, dated January 7, 1936.

One of the objects of the present invention is to provide a machine of this character of greatly simplified form and of speedy and efficient operation.

Another object of the invention is to provide means by which the contents of the mixing machine can be effectively discharged after having been mixed; in which the loading, inspection of contents and removal of the contents is greatly facilitated; in which the mixing blade or blades can be utilized as a discharge means for aiding in the discharge of the mixed materials, and in which a tight fit between parts of the body or trough of the mixer is assured and the oozing or trickling of the contents out of the joints between parts of the trough is prevented.

Another object of the invention is to provide in a machine of this character, a novel arrangement and shape of the mixing blades or paddles and particularly in relation to the discharge opening of the mixing chamber, wherein, in the case of multiple paddle mixers, the paddle or mixing blade which is situated adjacent to said discharge opening will have its axis located below that of a companion paddle; wherein the bottom or floor of the trough or mixing chamber of the machine is inclined or angularly disposed, with the axis of the paddles arranged one higher than the other or situated one above the other at an angle, and wherein a follower is provided for applying pressure upon the contents of the trough or mixing chamber to thereby force the same in a direction towards the paddles and toward the discharge opening.

The invention further contemplates a machine of novel design and construction and arrangement of parts to be hereinafter described and more particularly pointed out in the claims appended hereto.

In the accompanying drawings, Fig. 1 is a side elevation, with parts broken away and other parts shown in section, of a mixing machine constructed in accordance with the invention; Fig. 2 is a front elevation of the machine, with parts of the front of the trough broken away and other parts shown in section; Fig. 3 is a sectional view through one of the side walls of the trough and through a part of the front of the trough showing the latch for holding the hinged front of the trough in its closed position; Fig. 4 is a sectional view through a portion of the mixer, showing a modified construction in which the front of the trough is provided at its lower end with a pivoted segment, gate or trap which can be swung to open position to allow discharge of the contents from the trough of the machine; Fig. 5 is a similar sectional view through a modified means for hinging and swinging the lower segmental portion, gate or trap of the front of the trough, Fig. 6 is a sectional view through a pivot for the front of the trough, indicating how a heating or cooling fluid may be flowed through the pivot pin, or similarly through a bolt, to facilitate the opening of the front of the trough; Fig. 7 is a similar sectional view of a modified form of pivot or bolt, and Fig. 8 is a front elevation of a part of the trough, looking into the trough at a mixing or agitating paddle therein.

Referring to the structure disclosed in Figs. 1 to 3 inclusive, 1 indicates generally the body of the trough or mixing chamber of the machine. The same is supported in any suitable manner, such as upon the standard 2, provided with a suitable base 3 adapted to be firmly anchored to the floor or other substantial foundation. The walls of the body of the mixing chamber are preferably of substantial thickness to permit of the provision of passages 4 through which a suitable heating or cooling fluid may be caused to flow according to the requirements of the materials to be mixed.

In the drawings, a two-paddle machine is disclosed, and the trough or mixing chamber of a machine of this character includes the base or bottom portion 5 which is inclined upwardly toward the rear of the machine, and the side walls 6 and 7, as well as a front member 8. Any or all of these portions of the trough or mixing chamber may be provided with the passages 4 for the reception of a heating or cooling fluid. The front member 8 of the trough or mixing chamber is of arcuate form, and in its closed position, as shown in Fig. 1, it is positioned between the side walls 6 and 7, having its lower end 9 seating against the forward end 10 of the bottom 5 of the trough, as shown in Fig. 1 and providing a close fit thereagainst to effectively prevent leakage of the contents at this point.

At its upper end, the front member 8 of the trough is pivoted between the side walls 6 and 7, the pivot pin for the front member being shown at 11, and being provided with an internal passage 12 for a portion of its length, said passage being in communication with a tube or pipe 13 extending to latch-operating means for the front member of the trough. The passage 12 is in communication with a slide valve 14 connected to a source of hydraulic fluid whereby, upon proper manipulation of the valve 14, the hydraulic fluid may be caused to exert pressure upon the latching means for the front member 8 of the trough to thereby hold said member 8 in its closed position, as shown in Fig. 1.

The latching means for the front member 8 of the trough or mixing chamber, consists of the two cross-heads 15, 16, each of which carries the latches 17, each latch terminating in a hooked end portion 18 for engagement over a flange 19 extending along the edge of the side member 6 or 7 of the trough, as shown in Fig. 3. Each of the cross heads 15 and 16 is provided with a piston 20, the two pistons 20 being slidable in a cylinder 21 with which one end of the tube or pipe 13 communicates, as clearly seen in Fig. 2. This arrangement is such that when hydraulic pressure is exerted through the tube or pipe 13, said pressure acting upon the ends of the pistons 20 will force the pistons in opposite directions, causing the hooked ends 18 of the latches 17 to be held in engagement with the flanges 19 on the side walls of the trough, thereby retaining the front member 8 of the trough in its closed position.

The front member 8 may be opened and closed by means of hydraulic pressure operative in a cylinder 22, the piston 23 therein being connected to an arm 24 secured on the pivot shaft for the front member 8 of the trough. Through the arrangement described, the front member 8 of the trough may be retained in either its closed or open position whenever desired, said member, when swung to its open position, allowing discharge of the contents of the trough by reversal of the direction of rotation of the paddles within the trough, the reverse movement of the paddles acting to force the contents of the mixing chamber out of the discharge opening. It is, of course, assumed that when the paddle blades are used in this manner the blades will be so shaped that when reversed the same will act in the manner above described.

The bottom 5 of this trough or mixing chamber is provided with a central ridge 25, the same serving to divide the bottom of the chamber into two arcuate sections 26 and 27 within each of which is rotatively mounted a paddle member or mixing blade 28. These paddle members may be made in various shapes and forms to suit different mixing requirements, and an example of a very satisfactory paddle member is shown in Fig. 8, wherein a helical type of blade is shown, the same being provided with rounded end deflectors 29 which are so shaped that during rotation of the paddle they direct the materials being mixed toward the center of the trough and will continue to do this even when the rotation of the paddle is reversed, thus at all times preventing the forcing of material between the paddle blade shaft ends and the side walls of the trough during the mixing and discharge operations.

In a machine of this character, wherein a plurality of paddle members are employed, it is to be noted that one of the paddles 28 is arranged at a higher point in the mixing chamber or trough than the other, or in other words, the two paddles have their axes situated one above the other at an angle, which may be 45°, more or less, with the discharge opening, which as shown may be at the front of the mixing chamber, just below the forward portion of the lowermost paddle when the front member of the mixing chamber is swung to open position. With this arrangement, a reverse rotation of the paddles causes the mixed materials to be quickly ejected out of the discharge opening, and the opening being at the forward part of the machine, it is quickly available for inspection, cleaning and for the easy and proper placement of a suitable receptacle to catch and collect the material being ejected from the mixing chamber.

When the machine is in operation, the top of the mixing chamber is adapted to be closed, and particularly if the machine is of the vacuum type, by means of a swinging cover 30, the same being mounted for swinging movement upon shaft 31 rotatively mounted in bearings at the rear end and at the top of the trough or mixing chamber 1. The cover 30 is adapted to be raised and lowered by hydraulic means or by any other suitable means. In the case of hydraulic means, the cylinder 32 contains the conventional piston from which the rod 33 extends, the upper end of said rod being pivotally attached to an arm 34 secured to and projecting from the cover 30. This arrangement is such that by raising and lowering of the rod 33 by the hydraulic means described, the cover may be raised, as shown in dotted lines in Fig. 1, or it may be lowered to closed position, as shown in full lines in the drawing. The hydraulic means for raising and lowering the cover is suggestive as other means may readily be employed for this purpose.

Secured on the shaft 31 is an arcute follower or pressure-imposing member 35, the shape of the same being more clearly shown in Fig. 1 wherein it will be noted that said member is arranged to closely fit within the trough or mixing chamber, and is caused to exert downward pressure upon the contents thereof to force the same toward and between the mixing paddles 28. Said follower is preferably, but not necessarily, of hollow construction, being thereby provided with the interior chamber 36 in which a vacuum or other insulation may be had or through which a heating or cooling fluid may be passed. The means for raising and lowering the follower 35 consists of a segmental gear 37 secured on shaft 31, said gear being in mesh with a rack 38 on piston rod 39 arising from the hydraulic cylinder 40. By raising or lowering of the conventional hydraulic piston within cylinder 40, the follower is caused to be either lowered to exert pressure against the material in the mixing chamber and thereby forcing the material toward the paddles, or else the follower may be raised to fit within the cover 30 as shown in dotted lines in Fig. 1, and when the trough or mixing chamber is being filled, the follower can be raised upwardly where it may be situated within the cover. In its lowered position, the follower 35 seats upon the top of the trough or mixing chamber as indicated at 41, thereby limiting its downward movement toward the paddles and holding it from contact with the same.

In Fig. 2 of the drawing is shown a gear casing or housing 42 containing the driving mechanism for the paddles. As this forms no part of the present invention, a detailed description of the same is not given herein.

From the foregoing, the operation of the improved mixing machine will be readily understood. To load the machine with the material to be worked, the cover and the follower 35 within the same are raised or elevated to expose the open top of the trough or mixing chamber. The material to be worked is dumped within the trough and the cover and follower are brought down and the paddles set in rotation. As the paddles are rotated, the hydraulic means for moving the follower is set in operation to cause the follower to apply pressure down upon the material, thereby causing the material to be directed toward and between the paddles 28. When the working or mixing of the material is completed, the front member 8 of the trough or mixing chamber is swung open to an extent required to allow the material to be forced out through the opening then created between the parts 9 and 10 of the front member and bottom of the mixing chamber. This opening can be regulated to any extent required, thereby controlling the ejection or extrusion of the material from the mixing chamber. In fact, by regulating the spacing between the front member 8 and the forward edge of the bottom 5 of the mixing chamber, the material can, if desired, be caused to be extruded from the mixing chamber in the form of a ribbon or tape. This ejection or extrusion of the mixed material from the machine is facilitated by rotating the paddles in a direction opposite to that in which they are normally rotated when mixing the material, such movement of the paddles causing the material to be forced out of the discharge opening and resulting in the mixing chamber being expeditiously cleared of its contents.

In the embodiment of the invention disclosed in Fig. 4, the main structural features of the machine may be similar to those described in connection with Figs. 1 and 2. It will be noted however, that in the embodiment shown in Fig. 4, the front section 8 of the mixing chamber or trough is of two-part construction. That is to say, it is provided with an upper arcuate section 42 which may be pivoted at its top as described in connection with the structure of Figs. 1 and 2, or it may be a rigid part of the chamber, and a lower, independently-movable segment 43 constituting a trap-door which can be opened to permit discharge of the contents of the trough or mixing chamber, as indicated in Fig. 4.

In the form shown in Fig. 4, the door portion 43 is provided with one or more lugs 44, pivoted at 45, to end of lever or levers 46, said lever or levers being pivoted at 47 to lugs 48 projecting from the part 42 of the front member 8, or preferably from the sides of the trough. The opposite end of lever or levers 46 is pivoted at 49 to a piston rod 50 extending from a piston located in the hydraulic cylinder 51. Through this arrangement the trap door 43 can be moved to and from the outlet opening 52 to either completely close the same or else permit the discharge of the contents of the mixing chamber. The segmental trap door 43 is moved to closed position and a heated fluid is caused to flow through it, and expansion of the metal of the door results, creating a very positive and secure fit of the door in the outlet opening 52. This procedure is reversed by shrinking the door by the employment of a cold fluid, thus facilitating the opening of the door. This novel means may also be applied to the front movable member 8 shown in Figs. 1 and 2, in place of the hinge pins or bolts, thus having the stationary parts of the mixing chamber always rigid.

A somewhat similar arrangement is disclosed in Fig. 5, wherein the front member 8 of the mixing chamber is provided with a lower trap-door section 54, pivoted at 55 and adapted to be swung on its pivot toward or away from the outlet opening 52. In this arrangement, the trap door 54 is provided with lugs 56 between which is pivoted one end of a connecting rod 57, the opposite end thereof being pivoted at 58 to the end of a piston rod 59 extending from a piston located within the hydraulic cylinder 69.

In the embodiment of the invention shown in Figs. 1 and 2, it will be observed that the front member 8 of the mixing chamber, when hinged and in its closed position, fits between the side walls 6 and 7. To prevent sticking of the front member between the side walls, due to adherence of the material, or for other reasons, I find it desirable to provide freeing means for said front member 8, usable when it is desired to swing the front member to its open position. In this connection, reference is to be had to Fig. 6 wherein a form of pivotal means for the front member 8 of the mixing chamber is shown, and wherein also, an arrangement is provided for permitting an easy opening of the front member 8. In this construction, the front member 8 is provided with a sleeve 54a fitting around a hollow pivot pin 55a and insulated therefrom by a sleeve of insulation 56a. A tube 57a communicates with the interior 55$^1$ of the pivot pin 55a, and said tube is in communication with piping 58a leading from a source of hot water, steam or other heating fluid, said fluid being thus circulated through the interior of the pivot pin. This arrangement is such that when desired, heated fluid may be circulated through the pivot pin to thereby expand the same by heat, and the shoulders 59a and 60 located at the opposite ends of the pivot pin will act to spring the walls 6 and 7 of the mixing chamber apart to a very slight degree, but nevertheless sufficiently to free the front member 8 of the chamber and enable it to be freely swung to open position and as freely closed. In larger sized machines this may also be applied to bolts holding the two sides of the chamber together in relation to the chamber section that is to be moved, or it may be applied at other locations as required in the manner above explained. When the pivoting means for the front member 8, shown in Fig. 6 is employed, it will be obvious that the tube 13 will not be connected to the interior of the pivot 55a but may be connected directly to the slide valve 14.

Other means for slightly springing the walls of the mixing chamber apart might be used, a simple form of such means being that shown in Fig. 7, wherein the pivot pin or bolt 61 is provided with oppositely-threaded end portions shown at 62 and 63. Said pivot pin is provided at one end with a head 64 receiving an arm or a tool 65 by which the pivot pin 61 may be rotated either manually or by mechanical means, the effect of such rotation being to cause the walls 6 and 7 to be slightly sprung apart, and particularly adjacent to the pivot for the front member 8, thereby avoiding friction between the side walls and the front member of the mixing chamber and permitting said front member to be readily moved to either open or closed position. Through an arrangement of this character, a tight fit can be secured between the sides of the front member of the chamber and the walls of the chamber, so that oozing out or trickling out of the contents of the chamber will be prevented. At the same time, the front member can be easily "freed up" at any desired time by slightly springing the walls as above pointed out so that the front member can be readily opened without friction or the application of extraordinary force.

While I have herein described the several improvements as being embodied in machines for mixing or agitating various materials, it will be apparent that the features of novelty herein described are equally applicable to various other types of machines. Hence where I herein referred to the machine as a "mixing machine" or to the chamber or trough thereof, as a "mixing chamber," I wish to be understood as comprehending within such terms any other types of machine or apparatus in which the novel arrangements of parts or combinations of parts will function in the manner herein described.

What I claim is:

1. In a machine of the character described, a mixing chamber having an arcuate curved wall extending upwardly at its rear, side walls on the chamber, a curved and pivoted cover, at least one paddle member rotatively mounted within the mixing chamber, a pivoted follower mounted to rotate on the same axis as the pivot for the cover and having a part adapted to be swung downwardly with an arcuate movement independently of the cover into the chamber to apply pressure against the material in the chamber and direct the same toward the paddle member.

2. In a machine of the character described, at least one rotative mixing element, a mixing chamber in which the same is rotatively mounted, a pivoted follower mounted above the mixing chamber and adapted to be moved downwardly therein to force material located within the chamber toward the rotative mixing element, a cover member also mounted above the mixing chamber and pivoted for swinging movement either toward or away from the top of the chamber.

3. In a machine as provided for in claim 2, wherein the inner surfaces of the cover member are so shaped as to enable the follower to fit inside of the cover member in any of the positions of the cover member.

4. In a machine as provided for in claim 2, wherein the follower and cover member are both mounted on the same axis, a pivoted front member for the mixing chamber, said front member being pivoted at the front of the chamber and mounted to have its lower end swung away from the body of the chamber to thereby provide a discharge opening between said lower end of the front member and the forward end of the chamber at the lower end of the same.

5. In a machine of the character described, a mixing chamber, a pair of rotary paddle members therein with one of said paddle numbers located below the other, said members having parallel rotary axes arranged with the axis of the upper paddle member to one side of the axis of the lower paddle member, the chamber being provided with a rear wall having its lower end terminating at a location close to the lowest point in the chamber, a front wall pivoted at the top and front of the chamber and operative to have its lower end meet the lower end of the rear wall at substantially the lowest point of the chamber, means for swingably moving the front wall to open or closed positions, a cover pivoted at the upper end of the rear wall, means for opening and closing the cover, a follower pivotally mounted on the same axis as the cover and shaped to fit within the cover, and means for moving the follower to locate it either down within the chamber or up inside of the cover.

EVARTS G. LOOMIS.

REFERENCES CITED

The following references are of record in the file of this patent:

UNITED STATES PATENTS

| Number | Name | Date |
|---|---|---|
| 1,260,684 | Kempter | Mar. 26, 1918 |
| 1,370,893 | Komarek | Mar. 8, 1921 |
| 1,418,642 | Gerard | June 6, 1922 |
| 1,457,343 | Bowen | June 5, 1923 |
| 1,518,129 | Banbury | Dec. 9, 1924 |
| 1,555,825 | Bowen et al. | Oct. 6, 1925 |
| 1,615,878 | Laird | Feb. 1, 1927 |
| 2,027,185 | Loomis | Jan. 7, 1936 |
| 2,215,976 | Robinson | Sept. 24, 1940 |
| 2,298,542 | Potter et al. | Oct. 13, 1942 |

FOREIGN PATENTS

| Number | Country | Date |
|---|---|---|
| 253,058 | Great Britain | June 10, 1926 |